COLOR TELEVISION SYSTEMS

Filed March 15, 1954 3 Sheets-Sheet 1

INVENTORS
WALTER G. GIBSON &
ALFRED C. SCHROEDER
BY
ATTORNEY

INVENTORS
WALTER G. GIBSON &
ALFRED C. SCHROEDER
BY
[signature]
ATTORNEY

INVENTORS
WALTER G. GIBSON &
ALFRED C. SCHROEDER
BY
ATTORNEY

United States Patent Office 2,920,130

Patented Jan. 5, 1960

2,920,130

COLOR TELEVISION SYSTEMS

Walter G. Gibson, Princeton, N.J., and Alfred C. Schroeder, Huntingdon Valley, Pa., assignors to Radio Corporation of America, a corporation of Delaware Application March 15, 1954, Serial No. 416,032

The terminal fifteen years of the term of the patent to be granted has been disclaimed 10 Claims. (Cl. 178—5.2)

The present invention relates generally to color television systems and more particularly to color television systems of the simultaneous subcarrier type.

In presently contemplated television systems which accord with the revised color television standards of the FCC, color detail which produces signals of frequency less than 500 kilocycles is reproduced by a three-color reproduction, color detail which produces signals of frequency greater than 500 kilocycles and less than 2 megacycles is reproduced in a two-color reproduction, while color detail which produces signals of frequency greater than two megacycles is reproduced in monochrome. The evolution of such a color television system, wherein various pieces of information are effectively assigned different bandwidths, is a result of a desire to convey the most useful information in a system of necessarily restricted overall bandwidth.

Studies of the needs of color vision appear to indicate that the compromise on full band three-color reproduction which the above-described system reflects is more or less compatible with the color vision characteristics of the human eye and the limitations thereof. In accordance with the aforementioned revised standards, the composite color picture signal transmitted includes a wide band brightness or luminance signal, and a phase and amplitude modulated color subcarrier which comprises two components in phase quadrature, one being narrow band and representative of a given color-difference signal, and the other being relatively medium band and representative of a second color-difference signal. There is thus available for utilization at a receiver the brightness signal and both components of the color subcarrier for signal frequencies falling in the aforementioned narrow band. Thus, three-color reproduction for such signal frequencies is feasible. For signal frequencies falling outside said narrow band but within said medium band, there is available to a receiver the brightness signal and but one of the subcarrier components, whereby only a two-color reproduction for such signal frequencies is feasible. For signal frequencies falling outside said medium band but within said wide band, only a black-and-white reproduction is feasible.

In accordance with the present invention a novel color television system is proposed which also utilizes a differential wide-medium-narrow restriction of three pieces of information transmitted, but wherein a chroma or saturation signal and a hue signal are the forms of information subject to the medium and narrow banding. It is believed that image reproductions developed in accordance with such a system are likely to be more pleasing to the eye.

In accordance with an embodiment of the present invention a phase and amplitude modulated color subcarrier formed in accordance with the presently prescribed color standards, except for the bandwidth restrictions on the quadrature components, is applied to both an amplitude detector and to an amplitude limiter, the output of the detector being essentially a signal indicative of chroma or saturation, and the output of the limiter being a constant amplitude carrier wave modulated in phase in accordance with hue. A bandpass filter for the limiter output, and a lowpass filter for the detector output, are utilized prior to remodulating the carrier with the detected signals so that the desired medium and narrow banding of the chroma and hue information may be effected. The newly formed phase and amplitude color subcarrier may then be combined with the brightness information and transmitted as a composite color picture signal in the usual manner. In further accordance with an embodiment of the present invention similar apparatus may be included in the signal receiving system prior to apparatus for conventional demodulation of the color subcarrier so as to prevent crosstalk between the hue and chroma signals of different bandwidth.

The proposed system is essentially compatible with systems which accord directly with the present color television standards. That is to say, a color receiver adapted to utilize the "Q" and "I" signals of standard transmission would reproduce generally satisfactory pictures in response to signals formed in accordance with the present invention. It may also be noted that so-called narrow band receivers, the color channels of which respond only to subcarrier components in the double sideband region, should operate precisely the same when supplied signals in accordance with the present invention as when provided with the standard signals.

Accordingly it is a primary object of the present invention to provide a novel and improved color television system of the simultaneous subcarrier type.

It is another object of the present invention to provide a novel color television system wherein the medium and narrow band signals accompanying the wide band brightness signal are signals representative of chroma and hue.

It is a further object of the present invention to provide a novel color television system wherein the bandwidth of signal frequencies for which hue information is supplied to the receiver differs from the bandwidth of signal frequencies for which chroma information is supplied to the receiver.

Other objects and advantages of the present invention will become readily apparent to those skilled in the art upon a reading of the following detailed description and an inspection of the accompanying drawings in which.

Figures *5a* and *5b* illustrate idealized filter characteristics suitable for several of the filter components in the apparatus illustrated in accordance with various described embodiments of the present invention.

Figure 1:
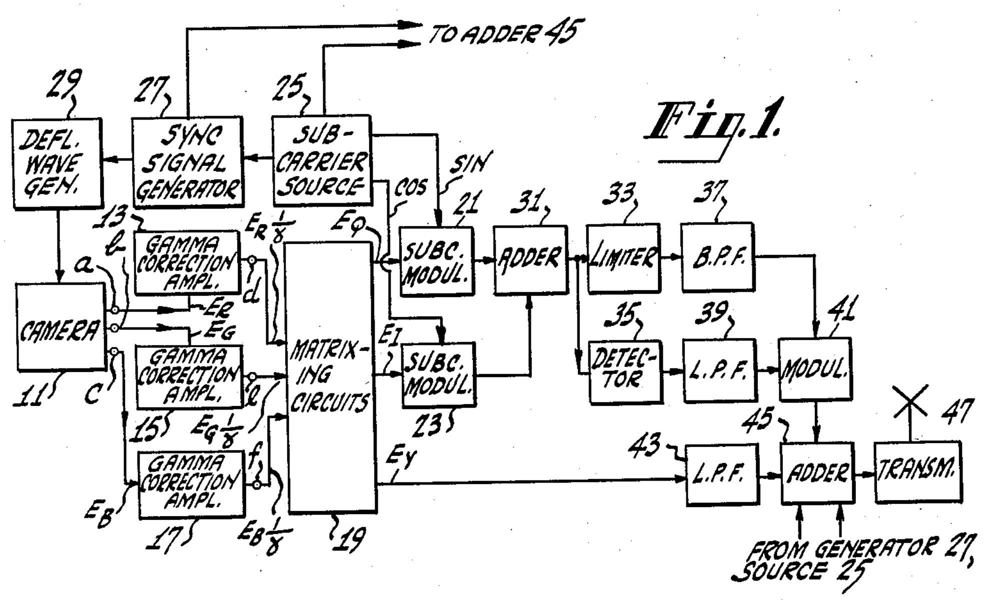
Figure 1 illustrates transmitting apparatus of a color television system in accordance with an embodiment of the present invention.

Referring to Figure 1 in greater detail, the block diagram illustrates the application of the principles of the present invention to modification of a subcarrier type color television transmission system, such as disclosed in the article by G. H. Brown and D. G. C. Luck, entitled "Principles and Development of Color Television Systems," appearing in the June 1953 issue of the RCA Review. A color television camera 11 is illustrated as the source of three simultaneous component color signals $E_R$, $E_G$ and $E_B$. The individual component color signals are applied to respective gradient correction amplifiers or so-called gamma-correction amplifiers 13, 15 and 17. The respective output signals $$E_R^{\frac{1}{\gamma}},\ E_G^{\frac{1}{\gamma}} \text{ and } E_B^{\frac{1}{\gamma}}$$

are representative of the original component color signals after introduction of a compensatory non-linearity, which in conjunction with the camera's non-linearity provides what is essentially the complement of the ultimate image reproducer's non-linearity.

The individually gamma-corrected signals are applied to suitable matrixing circuits 19 wherein the respective color signals may be combined in appropriate proportions and suitable polarities to obtain desired color mixture signal outputs. In a color television system of the type disclosed in the aforementioned article and in accordance with the aforementioned revised FCC standards, the output of matrixing circuits 19 may comprise so-called "Q" and "I" color-difference signals of the following characteristics:

$$E_Q=0.21E_R^{\frac{1}{\gamma}}-0.52E_G^{\frac{1}{\gamma}}+0.31E_B^{\frac{1}{\gamma}}$$

and $$E_I=0.60E_R^{\frac{1}{\gamma}}-0.28E_G^{\frac{1}{\gamma}}-0.32E_B^{\frac{1}{\gamma}}$$

and may also include a so-called luminance signal $E_Y$ comprising a mixture of the component color signals in proportion to the relative luminosities of the respective brightness, i.e.

$$E_Y=0.30E_R^{\frac{1}{\gamma}}+0.59E_G^{\frac{1}{\gamma}}+0.11E_B^{\frac{1}{\gamma}}$$

The "Q" and "I" color-difference signals are applied to respective subcarrier modulators 21 and 23 wherein respective waves of a predetermined subcarrier frequency but differing in phase by 90° are modulated by respective ones of the applied color mixture signals. The subcarrier frequency waves of phase quadrature relationship are derived from a subcarrier source 25, which also controls the generation of deflection driving and synchronizing pulses in a sync signal generator 27. The scanning operation utilized in camera development of simultaneous component signals is controlled by deflection wave generators 29, suitably synchronously controlled by the output of the sync signal generator 27.

The outputs of the pair of subcarrier modulators 21 and 23 are combined in adder 31 to provide a subcarrier wave output which is effectively modulated in phase in accordance with hue and modulated in amplitude in accordance with saturation. In a color television transmitter of the subcarrier type as described in the aforementioned article, the output of adder 31 would normally be combined with the wide band luminance signal $E_Y$ (after appropriate filtering thereof, as in lowpass filter 43), as well as with suitable color and deflection synchronizing information from generator 27 and source 25, as in an adder 45, and applied to suitable transmitting apparatus 47.

In accordance with the present invention limiter 33, detector 35, bandpass filter 37, lowpass filter 39 and modulator 41, are added to perform the novel function of differentially restricting the frequency bandwidths of a color hue signal and a color saturation signal. The purposes and functions of the added apparatus will be more readily appreciated when particular notice is taken of the omission of the usual "Q" and "I" band-limiting filters in the apparatus thus far described. In accordance with the aforementioned FCC color standards, the "Q" and "I" signals are effectively limited to respective bands of approximately 0 to 500 kc. and 0 to 2 mc. before application to modulation of the phase quadrature subcarrier components. This differential band-limiting of the respective color mixture signals is in accordance with the previously discussed division between three-color reproduction, two-color reproduction and monochrome reproduction in the video signal band. However, since a feature of the present invention is to subject a chroma signal and a hue signal to the medium nad narrow banding, rather than the color difference signals $E_Q$ and $E_I$, the admission of band limiting filters for the "Q" and "I" signals may be seen to be appropriate.

Since, as noted above, it is desired in accordance with the present invention to act upon a signal representative of hue, and also to act upon a signal representative of chroma, the presence of such information in the respective forms of phase and amplitude modulation in the subcarrier wave output of adder 31 calls for operation thereon to substantially separate these respective pieces of information. Thus, the output of adder 31 is applied, in accordance with the illustrative embodiment of Figure 1, to an amplitude limiter 33, as well as to an amplitude detector 35. Operating characteristics of the limiter 33 are chosen and adjusted such that substantially all vestiges of amplitude modulation of the subcarrier wave input are removed therein, and the output essentially comprises a constant amplitude subcarrier wave which varies in phase in accordance with hue. On the other hand, the output of detector 35 which is indicative of the amplitude modulation of the subcarrier wave is a good approximation of a signal indicative of the saturation of the colors of the scanned image. The saturation signal output of detector 35 is passed through lowpass filter 39 and applied to modulator 41 to amplitude modulate the constant amplitude subcarrier wave output of limiter 33 after passage of the latter through a bandpass filter 37. The output of modulator 41 is seen to again constitute a subcarrier wave modulated in amplitude in accordance with saturation. However, it should be apparent that the bandwidth of hue information relative to the bandwidth of saturation information is determined by the characteristics of bandpass filter 37 and lowpass filter 39.

Figure 5A:
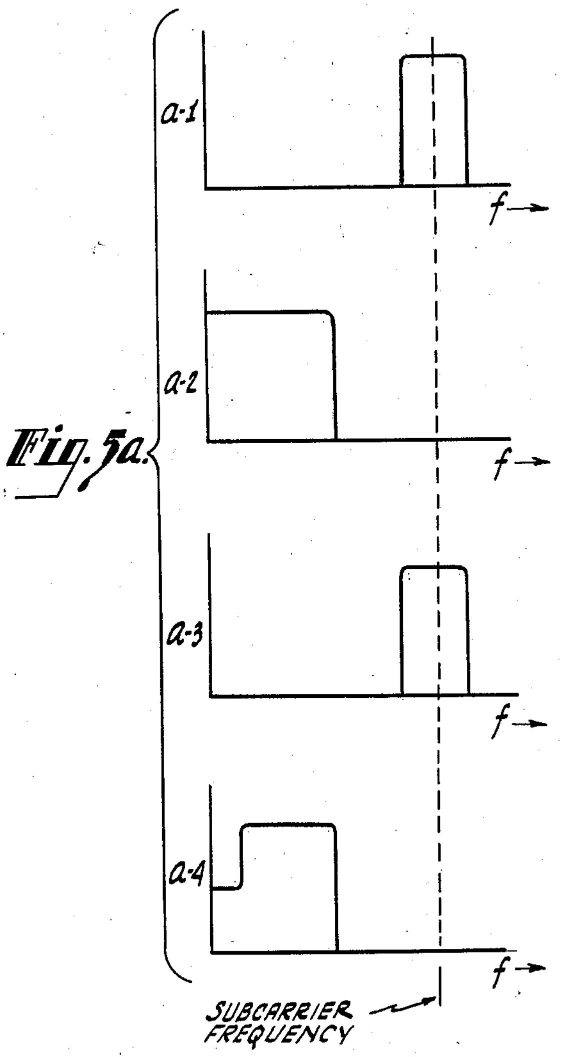
Figure 5B:
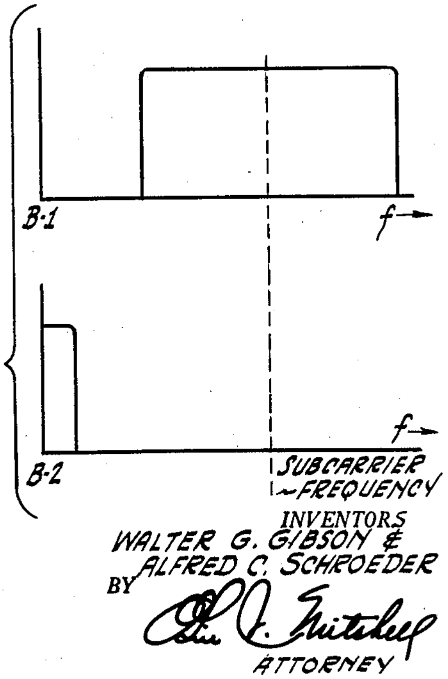

Thus, for example, if filters 37 and 39 possess filter characteristics of the shape illustrated by idealized curves *a*–1 and *a*–2, respectively, in Figure 5*a*, it will be seen that hue information is limited to a relatively narrow signal frequency band, such as the 0 to 500 kc. band conventionally assigned to the "Q" signals, while saturation information may extend throughout a wider band of signal frequencies, such as the 0 to 2 mc. band conventionally assigned to the "I" signal. Curves *b*–1 and *b*–2 in Figure 5*b* illustrate the respective filter characteristics which may be utilized for filters 37 and 39, respectively, to achieve the converse result, i.e. the narrow banding of saturation information and the medium banding of hue information. It is believed by the applicants that in either case various advantages in reproduction viewing may be attained over the systems of the prior art.

As illustrated, the subcarrier wave output of modulator 41 is combined in adder 45 with the wide band luminance signal $E_Y$ as passed by lowpass filter 43, and with suitable synchronizing pulses from generator 27 and color synchronizing bursts from source 25, to form a composite color picture signal which may be transmitted via an appropriate transmission medium by the transmitter 47.

Figure 2:
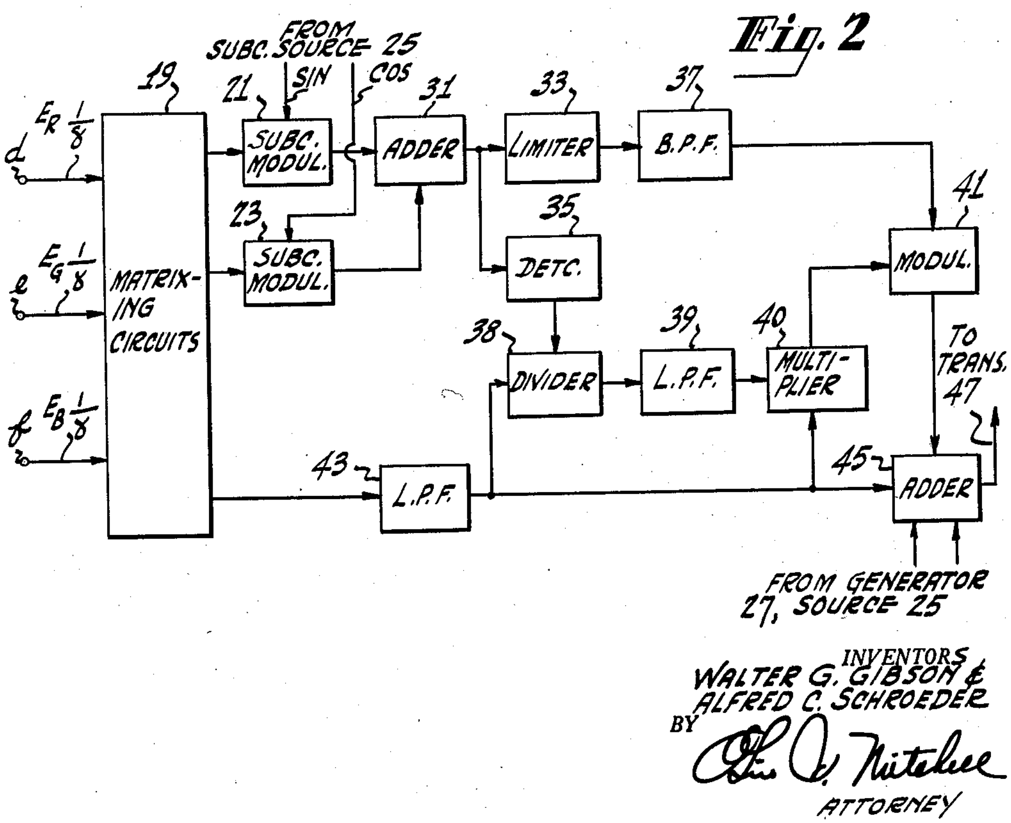
Figure 2 illustrates transmitting apparatus in accordance with another embodiment of the present invention.

Figure 2 illustrates a modification of the transmitting system of Figure 1 in accordance with another embodiment of the present invention. Similar elements in both figures have been designated by the same reference numerals. It may be noted that the modification adds a pair of elements to the combination, namely divider 38 and multiplier 40 in the path of the output of detector 35.

The development of color difference signals and a luminance signal in the matrixing circuits 19, the modulation of appropriate phases of a subcarrier with the developed color difference signals in modulators 21 and 23 and the combination of modulator outputs in adder 31 are similar to the operations previously described. Again, the output of adder 31 is fed to a limiter 33 to derive a constant amplitude subcarrier wave modulated in phase in accordance with hue, which is passed through the band pass filter 37 to limit the hue signal to the appropriate band. The output of adder 31 is also as before applied to the amplitude detector 35 to derive a signal indicative of the amplitude variations of the subcarrier wave output of adder 31. However, in the modified system, the output of detector 35 is not applied through lowpass filter 39 to modulator 41, but rather is applied to a divider 38, which also receives the wide band $E_Y$ luminance signal passed by lowpass filter 43, and which is adapted to provide an output proportional to the ratio $$\frac{E_A}{E_Y}$$

where $E_A$ is the output of detector 35. It will be readily appreciated that while $E_A$, representative of amplitude variations of the subcarrier wave output of adder 31, is a reasonable approximation of a saturation signal, a truer representation of saturation information is the ratio of $$\frac{E_A}{E_Y}$$

Thus where it is desired to effect the narrow and medium banding of a hue signal and a saturation signal, the application of the output of divider 38 to a lowpass filter 39 of the desired bandwidth characteristic is seen to be more theoretically correct than the application of the $E_A$ output of detector 35 to the filter 39.

As illustrated, the output of lowpass filter 39 is applied to a multiplier 40, which also receives the $E_Y$ luminance signal output of lowpass filter 43, and which is adapted to provide an output proportional to the product of $E_Y$ and $$\frac{E_A}{E_Y}$$

i.e. proportional to $E_A$. The output of multiplier 40 is then applied to modulator 41 to amplitude modulate the phase modulated subcarrier wave output of bandpass filter 37. The phase and amplitude modulated subcarrier wave output of modulator 41 is combined with luminance and synchronizing information in adder 45 and the composite color picture signal output thereof applied to transmitter 47, as in the system of Figure 1. It will be noted that the provision of multiplier 40, as above described, effectively returns the amplitude modulating signal applied to modulator 41 to a form similar to that which is applied to modulator 41 in the system of Figure 1, the difference residing in the prior application of the desired band limiting to a more accurate representation of saturation information.

An observation may now be made as to the character of the subcarrier signal component of the composite color picture signal transmitted in accordance with the systems of Figure 1 or Figure 2, and the compatibility thereof with color receivers intended for the standard system. It should first be noted that insofar as the double sideband region about the subcarrier frequency is concerned the signal transmitted in accordance with the present invention will be essentially identical with a signal transmitted in accordance with the revised color standards. Thus, for example, a so-called narrow band color receiver which utilizes color information only in this region will be unaffected by operation of a transmitter in accordance with the present invention. However, those color receivers which also utilize the color information in the single sideband region will be somewhat affected, since the signal components in the single sideband region will differ from those normally transmitted if the present invention is utilized. The effect, however, will not be very damaging, and reasonably satisfactory color pictures may be reproduced by such a receiver though not equipped to take direct advantage of the features of the present invention. A block representation of a color receiver as modified to take advantage of the features of the present invention is illustrated in Figure 3.

Figures 3, 4:
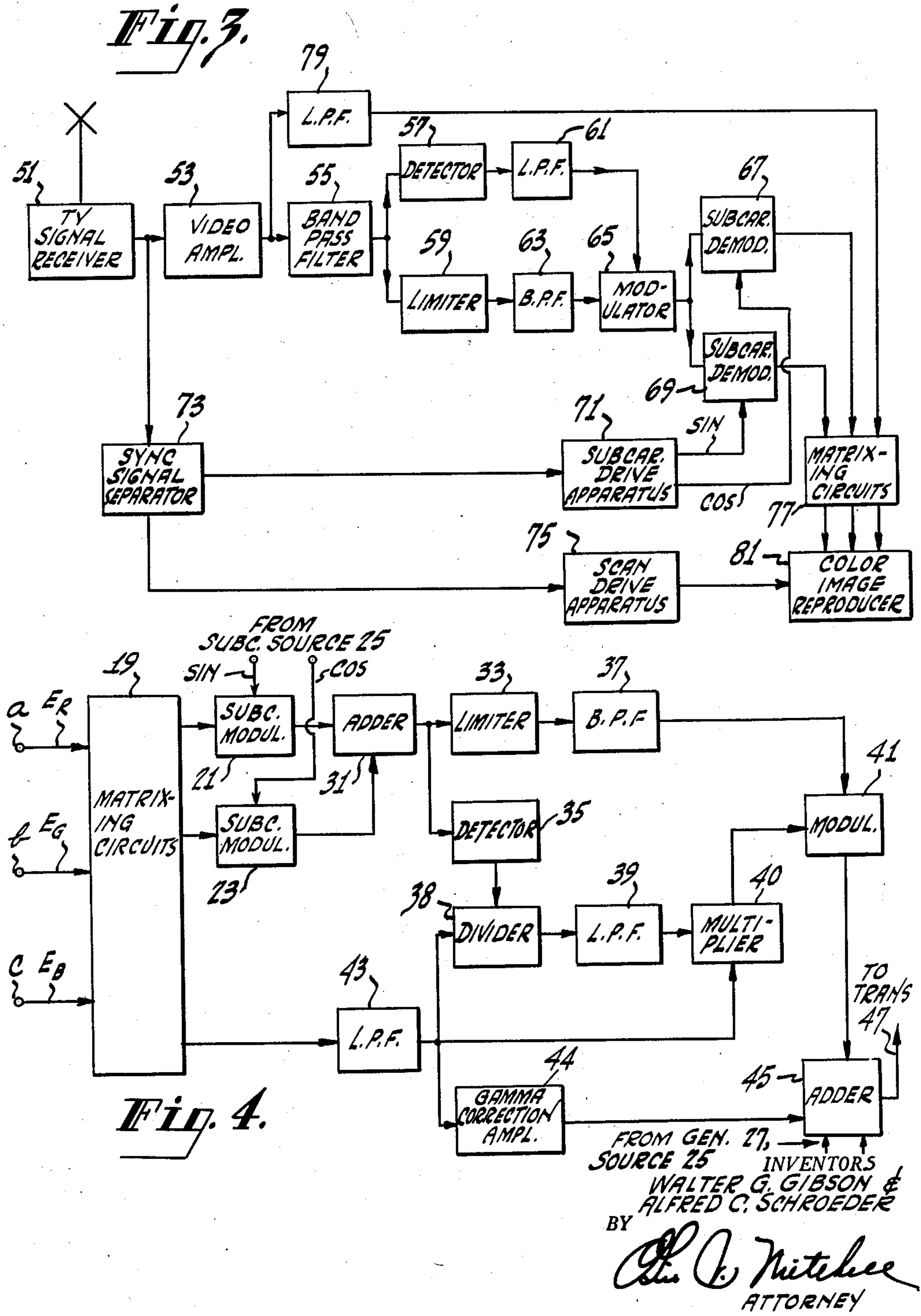
Figure 3 illustrates by block diagram receiving apparatus arranged in accordance with one form of this invention.
Figure 4 illustrates a modification of the transmitting apparatus of Figure 2 in accordance with a further embodiment of the present invention.

The receiving apparatus illustrated in Figure 3 is generally representative, apart from the modification to be particularly described, of presently contemplated color receivers for a simultaneous subcarrier type color television system and is in general accord with principles and apparatus discussed in the aforementioned article in the RCA Review. Carrier waves modulated by a composite color picture signal are illustrated as being received by conventional signal receiving apparatus 51, which may include the usual RF tuner, converting apparatus, IF amplifier, second detector etc. The detected video frequency signal output of receiver 51 is applied to a video amplifier 53 for suitable amplification. Synchronizing information is derived from the recovered signals in a sync separator 73 and utilized to synchronously control the receiver's scan drive apparatus 75 subcarrier drive apparatus 71. A lowpass filter 79 is provided to pass the wide band luminance signal from the output of video amplifier 53 to matrixing circuits 77, wherein the luminance signal may be combined with color difference signals recovered at the appropriate phases by subcarrier demodulators 67 and 69, the combination being effected with appropriate amplitudes and polarities for the input signal components to provide the simultaneous component color signals which may be applied to appropriate elements of a color image reproducer 81 for reproduction of the television image under scan control by apparatus 75.

It will be noted that in apparatus of the type disclosed in the aforementioned RCA Review article, video signals are applied to the appropriate demodulators 67, 69 from the receiver's video amplifier through respective filters having bandwidths appropriate to the narrow and medium banding of the color difference signals as provided for in the standards. Since, in accordance with the present invention, narrow and medium banding of the color difference signals as such is not effected in the transmitter, but rather respective hue and saturation signals are subjected to such differential band limiting, the apparatus interposed between video amplifier 53 and the demodulators 67 and 69 is in a novel form appropriate to the novel manner of operation of the present invention.

Thus, the output of video amplifier 53 is applied through a bandpass filter 55, having a width sufficient to encompass the single sideband region as well as the double sideband region about the subcarrier frequency, to an amplitude detector 57 and to an amplitude limiter 59 to separately recover hue and saturation information from the receiver subcarrier, in a manner similar to that utilized at the transmitter. The output of detector 57 is then passed through a lowpass filter 61 of appropriate bandwidth, i.e. substantially corresponding to the bandwidth of lowpass filter 39 at the transmitter, while the output of limiter 59 is passed through a bandpass filter 63 of respectively appropriate bandwidth, i.e. substantially corresponding to the bandwidth of filter 37 of the transmitter.

Representative filter characteristics for bandpass filter 63 and lowpass filter 61 are illustrated by the idealized curves *a*–3 and *a*–4, respectively, in Figure 5*a*, these curves being particularly appropriate where receiving signals which were formed at the transmitter in accordance with the narrow-band hue, medium-band chroma embodiment of the invention previously discussed with relation to curves *a*–1 and *a*–2. It is to be noted that the curve *a*3, illustrated as suitable for bandpass filter 63, is substantially identical with curve *a*–1, and that curve *a*–4 illustrated as suitable for lowpass filter 61, while corresponding in bandwidth to curve *a*–2, differs therefrom in that response to signal frequencies at the high end of the passband is approximately double the response for the lower signal frequencies. The stepped characteristic will be recognized as a conventional expedient for compensating for the loss of upper-sideband energy in the vestigial sideband transmission of the color subcarrier. It will be of course appreciated that it is not essential that such compensation be effected in the receiver's chroma signal filter 61, but that such compensation may be effected at other points in the over-all system, such as, for example, in the transmitter's chroma signal filter 39 itself.

The phase and amplitude modulated subcarrier is reformed in modulator 65 by amplitude modulation of the phase modulated output of filter 63 in accordance with the appropriately limited saturation signal output of filter 61. The video signals applied to subcarrier modulators 67 and 69 are thus derived from the output of modulator 65.

While the apparatus 57, 59, 61, 63, 65 might be omitted and the output of filter 55 may be readily applied to demodulators 67 and 69, the result would not be entirely satisfactory and would not utilize the present invention to full advantage due to the cross-talk between hue and saturation signals which would inherently result. That is, the preliminary separation of hue and saturation information and appropriate band limiting thereof insures that the information assigned the broader band will appear in the signals applied to the demodulators 67, 69 only in the form of modulation assigned to that information, and will not appear in the form of modulation assigned to the other information, as might occur in the single sideband region due to cross-talk resulting from loss of one sideband.

Figure 4 illustrates a modification of the transmitting system of Figure 2 for application to a form of simultaneous transmission system in which gamma-correction of signals is handled in a manner not provided for in the present standards. The present standards provide that the color signals which are mixed in the cited proportions and polarities to form the luminance signal $E_Y$ and the color difference signals $E_Q$ and $E_I$ are component color signals which have been individually gamma-corrected. However, it has also been proposed in the past that gamma-correction not be applied to the individual component color signals from which the luminance signal and color-difference modulating signals are formed, but rather that gamma-correction be only applied to the luminance signal per se after its formation from uncorrected component color signals. The showing in Figure 4 is of an application of the principles of the present invention to a system in which gamma-correction is applied in such a manner.

It will thus be noted that the input signals to matrixing circuits 19 in Figure 4 are derived from terminals *a*, *b* and *c*, rather than from terminals *d*, *e* and *f* following individual gamma-correction amplifiers as in Figure 2. A gamma-correction amplifier 44 is however provided in the luminance signal path between lowpass filter 43 and adder 45. It is noted however that the luminance signal required for application to divider 38 and multiplier 40 in the apparatus peculiar to the embodiment of the present invention as illustrated in Figure 2, is derived in the system of Figure 4 before modification thereof by the gamma-correction amplifier 44. From this illustration, the appropriate manner of modification of the other discussed embodiments of the present invention to fit a system handling gamma-correction in this manner should be readily apparent.

Having thus described the invention, what is claimed is:

1. In a color television system of the type wherein hue and saturation information concerning a subject image are conveyed by means of a phase and amplitude modulated subcarrier, the combination comprising means for developing in response to the scanning of the subject image a signal containing hue information concerning the subject image and substantially free of saturation information concerning the subject image, means for developing in response to the scanning of the subject image a signal containing saturation information concerning the subject image and substantially free of hue information concerning the subject image, means for effectively limiting the hue information containing in the former signal to a predetermined bandwidth, means for effectively limiting the saturation information contained in the latter signal to a different predetermined bandwidth narrower than said first-named predetermined bandwidth, and means for utilizing said pair of signals to form said phase and amplitude modulated subcarrier.

2. In a color television system of the type wherein hue and saturation information concerning a subject image are conveyed by means of a phase and amplitude modulated subcarrier, and wherein said phase and amplitude modulated subcarrier accompanies a wide band signal representative of luminance information the combination comprising means for developing in response to the scanning of the subject image a signal containing hue information concerning the subject image and substantially free of saturation information concerning the subject image, means for developing a signal containing saturation information concerning the subject image and substantially free of hue information concerning the subject image, means for effectively limiting the hue information contained in the first-named signal to a first predetermined bandwidth, means for effectively limiting the saturation information contained in the second-named signal to a second predetermined bandwidth, said first predetermined bandwidth being narrower than said second predetermined bandwidth, both of said predetermined bandwidths being narrower than the width of said wide band, and means responsive to said first-named and said second-named signals for forming said phase and amplitude modulated subcarrier.

3. In a color television system including a source of carrier frequency waves modulated in phase in accordance with hue and modulated in amplitude in accordance with saturation, the combination comprising means coupled to said source for deriving from the output of said source essentially constant amplitude waves of carrier frequency varying in phase in accordance with hue, additional means coupled to said source for deriving a saturation-representative signal proportional to the amplitude variations of the output of said source, means coupled to said additional deriving means for substantially limiting said saturation-representative signal to frequencies below a first predetermined frequency, a bandpass filter coupled to said first deriving means, means for amplitude modulating the phase modulated carrier frequency waves passed by said bandpass filter in accordance with said frequency limited saturation-representative signal, said filter substantially limiting the phase variations of the passed waves to frequencies below a second predetermined frequency different from said first-predetermined frequency, and signal utilization means coupled to said amplitude modulating means.

4. A combination in accordance with claim 3 wherein said signal utilization means comprises means for combining the output of said amplitude modulating means with other intelligence to form a composite color picture signal.

5. A combination in accordance with claim 3 wherein said signal utilization means comprises means for deriving respective component color signals from the output of said amplitude modulating means.

6. In a color television system, a source of carrier frequency waves modulated in phase in accordance with hue and modulated in amplitude in accordance with saturation, an amplitude limiter coupled to said source for substantially removing amplitude variations from said phase modulated carrier frequency waves, a bandpass filter having a passband centered about said subcarrier frequency, means for passing the phase modulated subcarrier frequency wave output of said limiter through said bandpass filter, an amplitude detector additionally coupled to said source for detecting the amplitude variations of the carrier frequency wave output of said source, a lowpass filter, the width of the passband of said low pass filter being other than half the width of the passband of said bandpass filter, means for applying the output of said detector to said lowpass filter, and means for modulating the carrier frequency waves passed by said bandpass filter with the output of said lowpass filter.

7. A combination in accordance with claim 6 wherein the passband of said bandpass filter is more than twice as wide as the passband of said lowpass filter.

8. A combination in accordance with claim 6 wherein the passband of said bandpass filter is less than twice as wide as the passband of said lowpass filter.

9. In a color television receiver adapted to receive a composite color picture signal including a phase and amplitude modulated color subcarrier, the combination comprising means for detecting the amplitude variations of the received color subcarrier, a lowpass filter coupled to the output of said detecting means, amplitude limiting means, responsive to the received color subcarrier to develop a phase modulated subcarrier output substantially devoid of amplitude variations, a bandpass filter, the width of the passband of said lowpass filter being other than half the width of the passband of said bandpass filter, means for applying the phase modulated subcarrier output of said amplitude limiting means to said bandpass filter, and modulator means coupled to said lowpass filter and said bandpass filter for modulating the phase modulated subcarrier from said bandpass filter with the output of said lowpass filter.

10. In a color television system, the combination comprising a source of subcarrier frequency waves modulated in phase in accordance with hue and modulated in amplitude in accordance with saturation, an amplitude limiter coupled to said source for providing an amplitude limited subcarrier frequency wave output substantially free of amplitude modulation, an amplitude detector additionally coupled to said source for detecting the amplitude variations of the output of said source, a bandpass filter, means for applying the amplitude limited subcarrier frequency wave output of said limiter to said bandpass filter, a low pass filter, the width of the passband of said low pass filter being other than half the width of the passband of said bandpass filter, means for applying the output of said amplitude detector to said low pass filter, and a modulator coupled to said filters for modulating in amplitude the amplitude limited subcarrier frequency waves passed by said bandpass filter in accordance with the signals passed by said low pass filter.

References Cited in the file of this patent

UNITED STATES PATENTS

| | | |
|---|---|---|
| 2,598,504 | Carlson | May 27, 1952 |
| 2,716,151 | Smith | Aug. 23, 1955 |
| 2,729,697 | Chatten | Jan. 3, 1956 |
| 2,773,116 | Chatten | Dec. 4, 1956 |

OTHER REFERENCES

Introduction to Color Television, Admiral Corp., February 1954, Chicago, Ill.